(12) United States Patent
Shao et al.

(10) Patent No.: US 12,510,544 B2
(45) Date of Patent: Dec. 30, 2025

(54) MAGNETIC ANALYSIS OF EXTRACELLULAR VESICLE GLYCANS

(71) Applicant: NATIONAL UNIVERSITY OF SINGAPORE, Singapore (SG)

(72) Inventors: Huilin Shao, Singapore (SG); Zhigang Wang, Singapore (SG); Xuecheng Sun, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 829 days.

(21) Appl. No.: 17/776,920

(22) PCT Filed: Nov. 16, 2020

(86) PCT No.: PCT/SG2020/050663
§ 371 (c)(1),
(2) Date: May 13, 2022

(87) PCT Pub. No.: WO2021/096434
PCT Pub. Date: May 20, 2021

(65) Prior Publication Data
US 2022/0412982 A1     Dec. 29, 2022

(30) Foreign Application Priority Data
Nov. 15, 2019   (SG) ............. 10201910706V

(51) Int. Cl.
*G01N 33/574*  (2006.01)
*G01N 27/74*   (2006.01)
(Continued)

(52) U.S. Cl.
CPC ..... *G01N 33/57492* (2013.01); *G01N 27/745* (2013.01); *G01N 33/54333* (2013.01); *G01N 33/6872* (2013.01); *G01N 2333/4724* (2013.01)

(58) Field of Classification Search
None
See application file for complete search history.

(56) References Cited

U.S. PATENT DOCUMENTS

| | | |
|---|---|---|
| 10,585,088 B2 | 3/2020 | Gohel et al. |
| 2008/0238411 A1 | 10/2008 | Kahlman et al. |

(Continued)

FOREIGN PATENT DOCUMENTS

| | | |
|---|---|---|
| CN | 101292147 A | 10/2008 |
| CN | 107614458 A | 1/2018 |

(Continued)

OTHER PUBLICATIONS

Pawinanto et al., Design optimization of active microfluidic mixer incorporating micropillar flexible membrane, Microsystem Technologies, 25, (2019), p. 1203-1209. (Year: 2019).*

Echevarria J. et al., "Microarray-based identification of lectins for the purification of human urinary extracellular vesicles directly from urine samples," *Chembiochem*, Jul. 8, 2014, vol. 15, No. 11, pp. 1621-1626.

(Continued)

*Primary Examiner* — Ellen J Marcsisin
(74) *Attorney, Agent, or Firm* — Harness, Dickey & Pierce, P.L.C.

(57) ABSTRACT

Devices and methods for analysing extracellular vesicle glycans are described. According to an embodiment, a microfluidic device comprises an inlet portion configured to receive a fluid sample; a mixing portion fluidically coupled to the inlet portion and configured to facilitate mixing between the fluid sample and magnetic nanoparticles functionalized to bind with extracellular vesicles and aggregate to vesicle glycans in the fluid sample; a magnetic separation portion fluidically coupled to the mixing portion and configured to separate clusters of magnetic nanoparticles from the fluid sample; and a magnetic sensor configured to measure magnetic properties of the fluid sample after it has passed through the magnetic separation portion. The magnetic nanoparticles may configured to aggregate in the presence of respective lectins when bound with extracellular (Continued)

vesicles carrying target glycans. In a specific embodiment, the magnetic particles comprise a magnetic polycore coated with polydopamine.

15 Claims, 15 Drawing Sheets

(51) Int. Cl.
  *G01N 33/543* (2006.01)
  *G01N 33/68* (2006.01)

(56) References Cited

U.S. PATENT DOCUMENTS

| | | |
|---|---|---|
| 2010/0277160 A1 | 11/2010 | De Theije et al. |
| 2014/0178365 A1 | 6/2014 | Ghaderi et al. |
| 2016/0320376 A1 | 11/2016 | Gohel et al. |
| 2017/0143233 A1* | 5/2017 | Audeh ............... A61K 49/0093 |
| 2017/0333914 A1 | 11/2017 | Kang et al. |
| 2018/0180604 A1 | 6/2018 | Itonaga et al. |
| 2020/0132682 A1 | 4/2020 | Chiang et al. |

FOREIGN PATENT DOCUMENTS

| | | |
|---|---|---|
| CN | 109738625 A | 5/2019 |
| WO | WO-2017/087940 A1 | 5/2017 |
| WO | WO-2018/172384 A1 | 9/2018 |

OTHER PUBLICATIONS

Zhao Z. et al., "A microfluidic ExoSearch chip for multiplexed exosome detection towards blood-based ovarian cancer diagnosis," *Lab Chip*, Feb. 7, 2016, vol. 16, No. 3, pp. 489-496.

Fang S. et al, "Clinical application of a microfluidic chip for immunocapture and quantification of circulating exosomes to assist breast cancer diagnosis and molecular classification," *PLoS One*, Apr. 3, 2017, vol. 12, No. 4, pp. e0175050: 1-13.

Shao H et al., "New Technologies for Analysis of Extracellular Vesicles," *Chem Rev*, Jan. 31, 2018, vol. 118, No. 4, pp. 1917-1950.

Williams C. et al, "Glycosylation of extracellular vesicles: current knowledge, tools and clinical perspectives," *J Extracell Vesicles*, Mar. 4, 2018, vol. 7, No. 1, pp. 1442985: 1-14.

Wang Z. et al., "Dual- Selective Magnetic Analysis of Extracellular Vesicle Glycans," *Matter*, Nov. 20, 2019, vol. 2, No. 1, pp. 150-166.

International Search Report and Written Opinion of the International Search Authority issued in PCT/SG2020/050663, mailed on Feb. 10, 2021; ISA/SG.

First Office Action for Chinese Patent Application No. 202080081117.0 issued Jan. 26, 2024.

Lu, Wan et al.; "Research Progress of Exosomes"; www.life.ac.cn; Aug. 15, 2013; pp. 438-442.

Chen, Li et al.; "Recent Advances in Glycan Labeling on Cell Surface"; Science China Press, 49, 5; lifecn.scichina.com; Feb. 19, 2019; pp. 563-574.

* cited by examiner

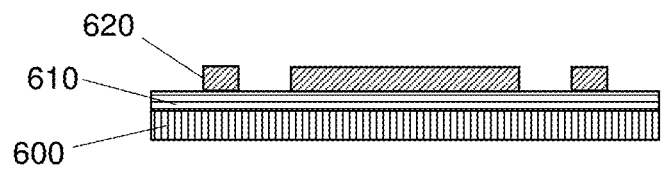
FIG. 6A
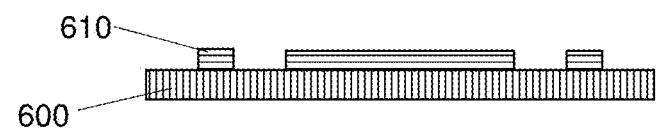
FIG. 6B
FIG. 6C
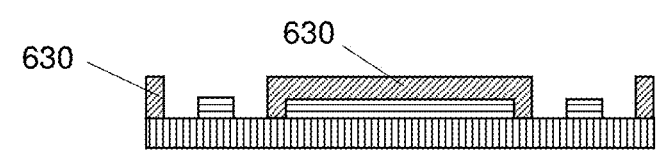
FIG. 6D
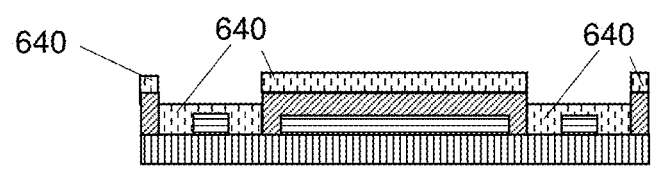
FIG. 6E
FIG. 6F
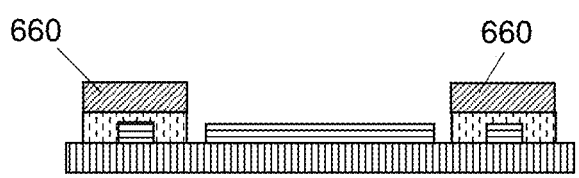
FIG. 6G
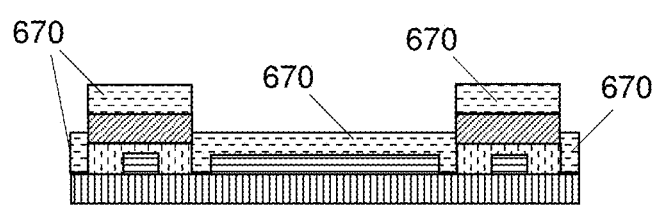
FIG. 6H
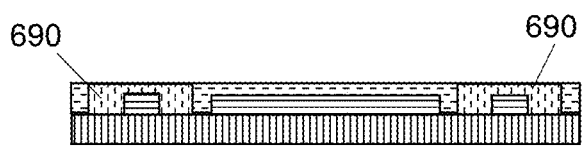

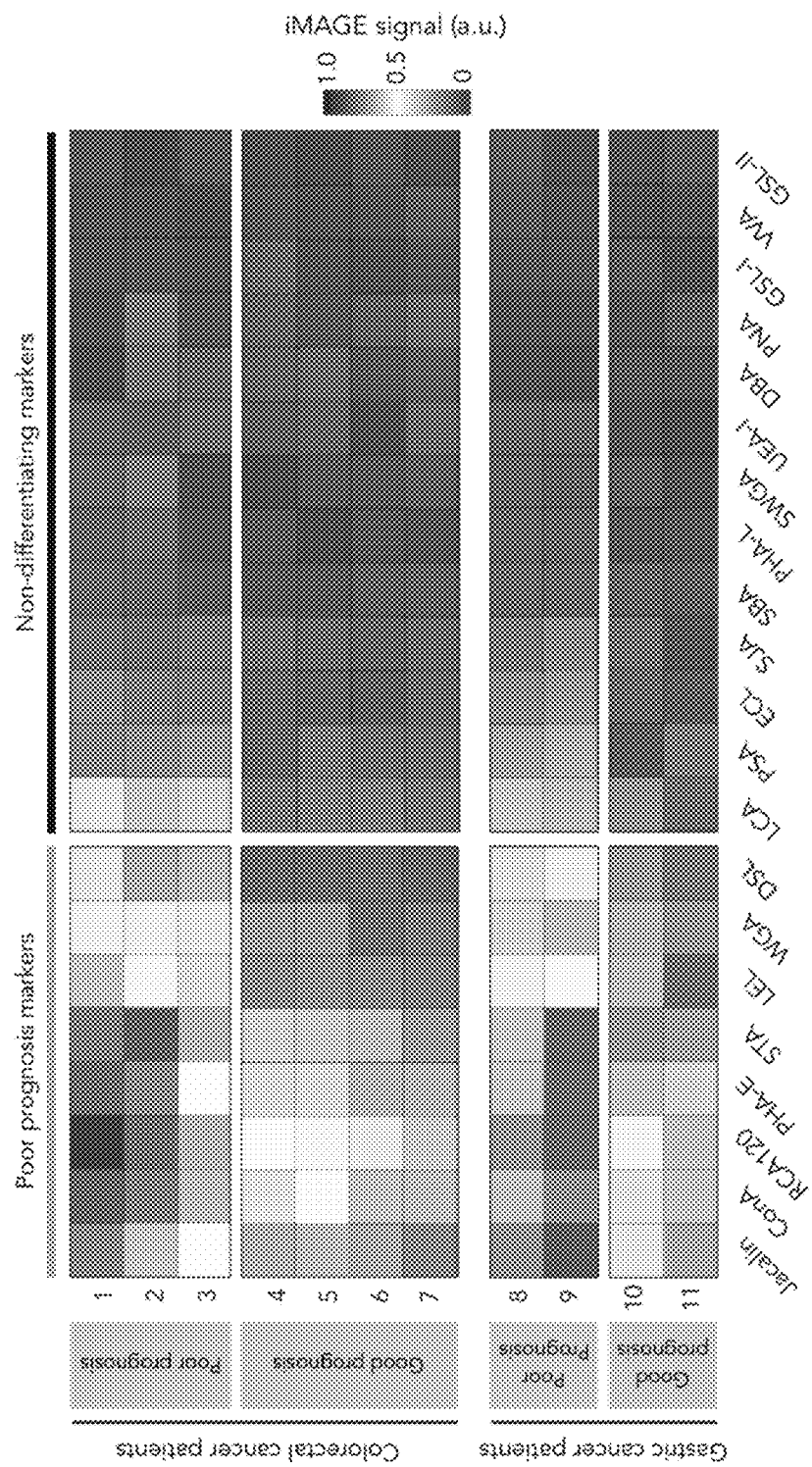

MAGNETIC ANALYSIS OF EXTRACELLULAR VESICLE GLYCANS

CROSS-REFERENCE TO RELATED APPLICATIONS

This application is a 371 U.S. National Phase of International Application No. PCT/SG2020/050663 filed on Nov. 16, 2020, which claims priority to Singapore Application No. 10201910706V filed on Nov. 15, 2019. The entire disclosures of the above applications are incorporated herein by reference.

TECHNICAL FIELD

The present disclosure relates to analysis of extracellular vesicle glycans and in particular to the microfluidic devices and magnetic nanoparticles in the analysis of extracellular vesicle glycans.

BACKGROUND

Extracellular vesicles (EVs) have recently emerged as an attractive class of circulating biomarker. Found in almost all bodily fluids, these nanoscale membrane-bound vesicles are actively secreted by cells into the circulation. As a robust messenger of intercellular communication, EVs harbor a rich repertoire of molecular contents, including nucleic acids, proteins, lipids as well as diverse glycans—carbohydrate modifications found free or bound onto proteins and lipids. Glycans possess compositional and structural diversity; multiple glycan combinations are possible according to the types of sugars and their organizational incorporation, leading to different biophysical properties and functionalities. In cells, such glycan diversity regulates numerous processes involved in protein folding, cellular recognition, differentiation and proliferation. In vesicles, recent studies have shown that EV glycans mediate vesicle biogenesis, intercellular recognition and communication, as well as disease progression and metastasis. Sensitive and multiplexed profiling of EV glycans could not only empower better understanding of EV mechanisms, but also translate as new disease diagnostics and therapeutics.

Despite such potential, the study of EV glycans lags significantly behind that of proteins and nucleic acids found in the vesicles. As in cellular studies, this delay is primarily due to a lack of suitable analytical technologies. Conventional assays use mass spectrometry to perform carbohydrate structural analysis. While the approach enables comprehensive measurements, it requires extensive processing (e.g., EV isolation, sample lysis, enzymatic digestion and reduction), a large sample amount, and advanced instrumentation and data analysis to adapt the assay for EV-specific glycan analysis. In comparison, lectin microarray offers a simplified alternative. The approach relies on carbohydrate-binding proteins known as lectins; after lectin immobilization onto a sensor chip, fluorescently-labeled EVs are applied and washed before measuring the bound signals. Nevertheless, for specific EV measurements, this assay not only requires a purified EV preparation, but also suffers from limited sensitivity. Due to the weak interactions of lectins and glycans (dissociation constant, $K_d=10^{-3}-10^{-6}$ M), this solid-phase immobilization further limits the assay's performance for detecting rare targets in scarce and complex specimens.

SUMMARY OF THE INVENTION

According to a first aspect of the present disclosure a microfluidic device for analyzing extracellular vesicle glycans is provided. The microfluidic device comprises: an inlet portion configured to receive a fluid sample; a mixing portion fluidically coupled to the inlet portion and configured to facilitate mixing between the fluid sample and magnetic nanoparticles functionalized to bind with extracellular vesicles and aggregate to vesicle glycans in the fluid sample; a magnetic separation portion fluidically coupled to the mixing portion and configured to separate clusters of magnetic nanoparticles from the fluid sample; and a magnetic sensor configured to measure magnetic properties of the fluid sample after it has passed through the magnetic separation portion.

In an embodiment, the magnetic sensor is a giant magnetoresistance sensor.

In an embodiment, the mixing portion comprises an array of micropillars.

In an embodiment, the magnetic separation portion comprises a serpentine channel overlaid with a magnetic separation strip.

In an embodiment, the microfluidic device comprises the magnetic nanoparticles functionalized to bind to extracellular vesicle in the fluid sample provided in the inlet portion.

In an embodiment the microfluidic device comprises a lectin selected to bind with target extracellular vesicle glycans in the fluid sample.

According to a second aspect of the present disclosure, a system for analyzing extracellular vesicle glycans in a fluid sample is provided. The system comprises a plurality of microfluidic devices, wherein different lectins are provided in respective inlet portions of the plurality of microfluidic devices to bind with different respective target extracellular vesicle glycans in the fluid sample.

According to a third aspect of the present disclosure magnetic nanoparticles comprising a magnetic polycore covered in a polymer coating functionalized to bind with extracellular vesicles are provided.

The polymer coating may be functionalized to bind with multiple extracellular vesicles. The polymer coating may be functionalized with polydopamine.

The polymer coating may be functionalized with recognition elements selected to bind with specific extracellular vesicles expressing respective biomarkers.

The magnetic nanoparticles may be configured to aggregate in the presence of respective lectins when bound with extracellular vesicles carrying target glycans.

The diameter of the magnetic nanoparticles may be selected to correspond to a diameter of the target extracellular vesicles. The diameter of the magnetic nanoparticles may be in the range 20 nm to 1000 nm.

According to a fourth aspect of the present disclosure, a method of analyzing extracellular vesicle glycans in a fluid sample portion. The method comprising: mixing the fluid sample with magnetic nanoparticles functionalized to bind with extracellular vesicles in the fluid sample and a lectin selected to bind with target extracellular vesicle glycans in the fluid sample portion; magnetically separating nanoparticle clusters formed by multivalent binding of the lectins and target extracellular vesicle glycans; measuring a magnetic property of the remaining fluid sample portion; and determining a characteristic of the extracellular vesicle glycans in the fluid sample from the magnetic property of the remaining fluid sample portion.

According to a fifth aspect of the present disclosure a method of analyzing extracellular vesicle glycans in a fluid sample is provided. The method comprises, for respective fluid sample portions of the fluid sample, carrying out a method of analyzing extracellular vesicle glycans in a fluid sample portion to determine a characteristic of each of a plurality of respective target extracellular vesicle glycans in the fluid sample from the respective magnetic properties of the respective remaining fluid sample portions.

A characteristic of each of the respective target extracellular vesicle glycans in the fluid sample may be determined from the respective magnetic properties of the respective remaining fluid sample portions and comprises identifying at least one conserved glycan signature.

The conserved glycan signature is measured with lectin RCA120 and/or WGA.

According to a sixth aspect of the present disclosure a method differentiating patient prognosis is provided. The method comprises analyzing extracellular vesicle glycans in a fluid sample corresponding.

The respective target extracellular vesicles and associated glycans may be selected for differentiation of patient prognosis in colorectal and gastric cancer.

The magnetic nanoparticles may be functionalized with antibody CD24 for binding with cancer extracellular vesicles.

A prognostic glycan signature may be measured with lectins selected from Jacalin, ConA, RCA120, PHA-E, STA, LEL, WGA and DSL.

BRIEF DESCRIPTION OF THE DRAWINGS

In the following, embodiments of the present invention will be described as non-limiting examples with reference to the accompanying drawings in which:

FIG. 6A to FIG. 6H show the steps in a method of fabricating a sensor used in embodiments of the present invention;

FIG. 12A to FIG. 12C show analysis of cancer extracellular vesicles to determine a prognosis.

DETAILED DESCRIPTION

The present disclosure relates to magnetic analysis extracellular vesicle glycans. The underlying platform of embodiments of the present invention integrates three functional steps: magnetic labeling of extracellular vesicles (EVs); aggregation of labeled EVs; and magnetic measurement. These functional steps will now be described with reference to FIG. 1A to FIG. 1C.

Figure 1A:
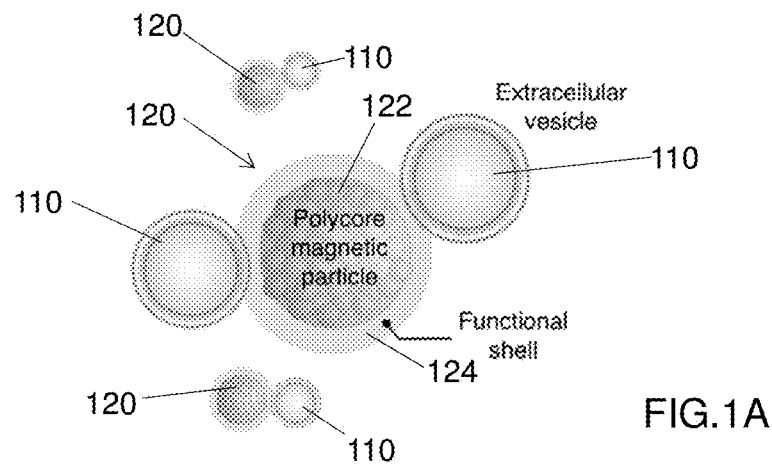
FIG. 1A illustrates magnetic labelling of extracellular vesicles according to an embodiment of the present invention.

FIG. 1A illustrates magnetic labelling of extracellular vesicles according to an embodiment of the present invention. The EVs 110 are magnetically labeled with magnetic nanoparticles 120. The magnetic nanoparticles 120 are sized matched to the EVs 110. The magnetic nanoparticles 120 comprise a magnetic polycore 122 formed from a plurality of magnetic particles and a functional shell 124. The functional shell 124 is coated on the magnetic nanoparticles 120 to improve binding with the EVs 110. The functional shell 124 may comprise, for example polydopamine, or antibodies.

Figure 1B:
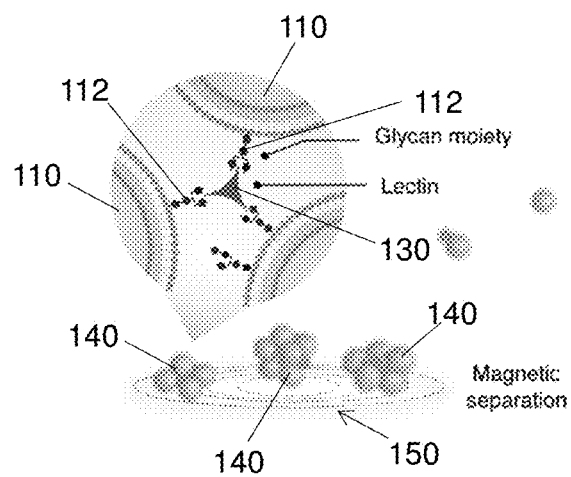
FIG. 1B illustrates aggregation of magnetically labeled extracellular vesicles according to an embodiment of the present invention.

FIG. 1B illustrates aggregation of magnetically labeled extracellular vesicles according to an embodiment of the present invention. As shown in FIG. 1B, targeting lectins 130 are added to facilitate aggregation of the labeled EVs. In the presence of specific glycan moieties 112 on the extracellular vesicles 110, the addition of targeting lectins 130 causes multivalent binding and aggregation of the EVs 110 and their associated magnetic nanoparticles 120. This aggregation is dual-selective, for both EV biophysical characteristics and specific glycans. This forms aggregates 140 of EVs. The aggregation only responds to specific glycans, and does not respond to free-floating glycosylated proteins. As more EV glycan-specific aggregates 140 form, they are sedimented by an external magnetic gradient 150 and depleted from the solution to leave a supernatant.

Figure 1C:
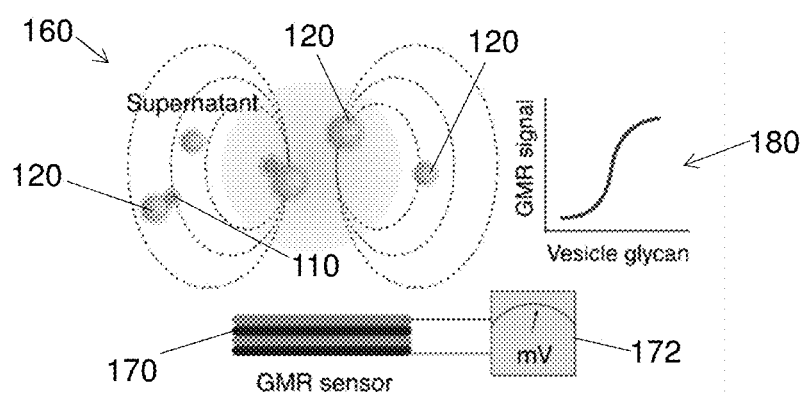
FIG. 1C illustrates magnetic measurement of a supernatant according to an embodiment of the present invention.

FIG. 1C illustrates magnetic measurement of a supernatant according to an embodiment of the present invention. The remaining magnetic nanoparticles 120 in the supernatant 160 are measured in real-time with a giant magnetoresistance (GMR) sensor 170. The output from the GMR sensor 170 is coupled to a voltmeter 172. The GMR signal 180 can be directly correlated to EV glycan profiles. This can be used to profile specific glycan moieties found on the EVs.

To address the challenges mentioned in the background section, we reason that magnetic measurements have distinct advantages. First, magnetic nanomaterials can be size-controlled and multifunctional to improve interaction kinetics (i.e., solution-phase reactions). Second, magnetic measurements are fast and require minimal sample processing, as native biological samples have negligible background susceptibility. We thus developed an all-magnetic platform for direct profiling of EV glycans in native clinical biofluids. The technology utilizes rationally-designed polycore magnetic particles (PMPs) to transduce EV glycan signatures into magnetic signals. For specific signal transduction, the platform enables EV glycan-lectin interactions in the solution phase to induce dual-selective aggregation of the PMPs—that is specific to both EV biophysical characteristics and their glycan composition but unresponsive to free-floating glycoproteins—to cause magnetic signal changes in situ. The resultant magnetic signals are quantified in real time through a built-in magnetoresistance sensor for direct analysis of EV glycans. When implemented on a miniaturized microfluidic platform, the technology enabled rapid, wash-free, and multiplexed analysis of EV glycans in complex biofluids (<30 min, 1 µl of native samples). We further applied the developed platform to examine native clinical samples. The technology could not only reveal glycan signatures of cancer EVs against different biological background, but also differentiate patient prognosis characteristics through direct EV glycan analysis.

Figure 2:
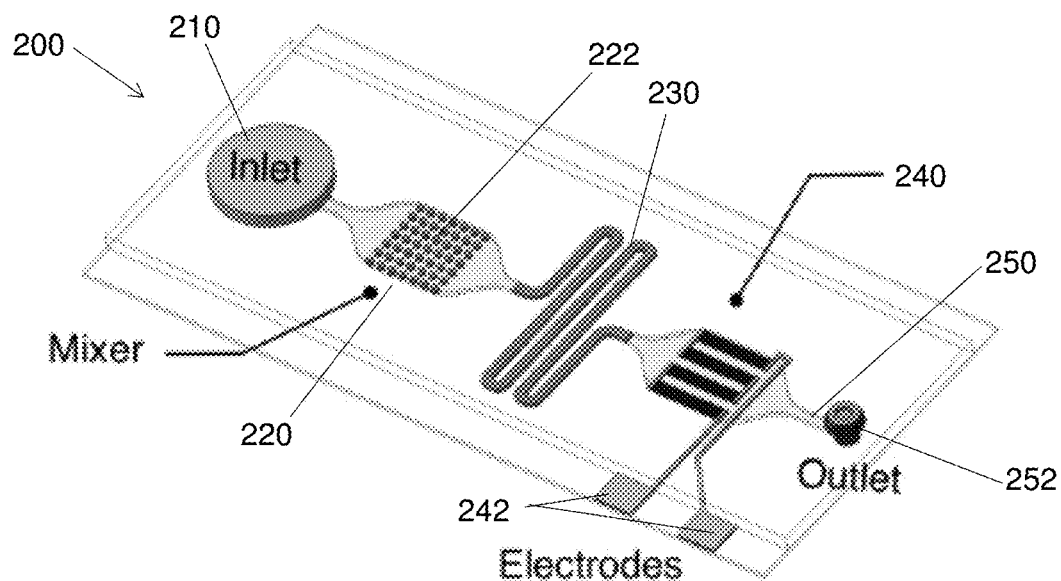
FIG. 2 shows an assay cassette for carrying out analysis of extracellular vesicle glycans according to an embodiment of the present invention.

FIG. 2 shows an assay cassette for carrying out analysis of extracellular vesicle glycans according to an embodiment of the present invention. The assay cassette 200 is configured to be received by a common measurement cartridge. The measurement cartridge is described below with reference to FIG. 4.

As shown in FIG. 2, the assay cassette comprises four key compartments: an inlet 210 for sample loading and magnetic labeling, a mixer 220 comprising an array of micropillars 222 to improve local mixing and aggregate formation, a serpentine sorter 230 to increase contact time with the external magnetic field for depletion of large polycore magnetic particle (PMP) aggregates, and an embedded giant magnetoresistance (GMR) sensor 240 for direct measurement of the magnetic supernatant. The assay cassette may be recyclable and may be reused for analysis of different samples.

The assay cassette 200 is provided with recesses running along each side to allow insertion into the measurement cartridge. The assay cassette 200 comprises microfluidic channels which form the inlet 210, the mixer 220, the serpentine sorter 230, a sensing area which overlaps the GMR sensor 240 and an outlet 250. The serpentine sorter 230 comprises a channel which aligns with a magnetic separation strip on the common measurement cartridge to deplete large PMP aggregates. The outlet 250 is provided with an outlet valve 252 which can be removed to allow a sample to flow from the inlet 210 through the components of the assay cassette 200. A pair of electrodes 242 are provided on one of the recesses to allow electrical connection to the GMR sensor 240 when the assay cassette 200 is inserted into a measurement cartridge.

Standard soft lithography was used for fabricating the microchannel and its associated micropillars in the mixer. We used SU-8 negative resist (SU8-2025, Microchem) to prepare the mold. The photoresist was spin-coated onto a silicon wafer at 2000 rpm for 30 s, and baked at 65° C. and 95° C. for 2 min and 5 min, respectively. After UV light exposure, the resist was baked again before being developed under agitation. The developed mold was chemically treated with trichlorosilane vapor inside a desiccator for 15 min before subsequent use. Polydimethylsiloxane polymer (PDMS) and crosslinker were mixed at a ratio of 10:1 and casted onto the SU-8 mold. After curing at 65° C. for 4 h, the PDMS layer was cut from the mold and assembled onto the GMR sensor.

Figure 3A:
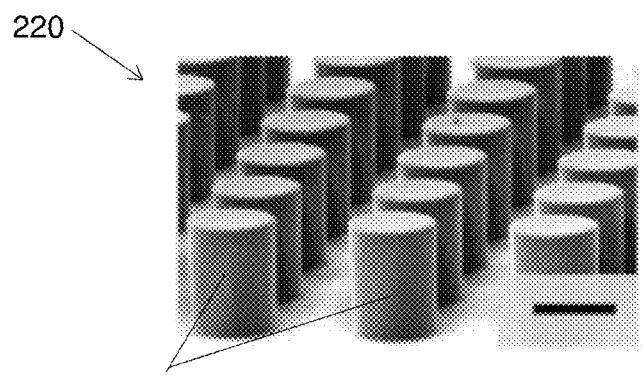
FIG. 3A shows a scanning electron micrograph of a mixer of an assay cassette according to an embodiment of the present invention.

FIG. 3A shows a scanning electron micrograph of a mixer of an assay cassette according to an embodiment of the present invention. As shown in FIG. 3A, the mixer 220 comprises a plurality micropillars 222 to enhance lectin mixing and aggregate. The micropillars 222 are cylindrical in shape. The scale bar in FIG. 3A indicates 50 µm.

Figure 3B:
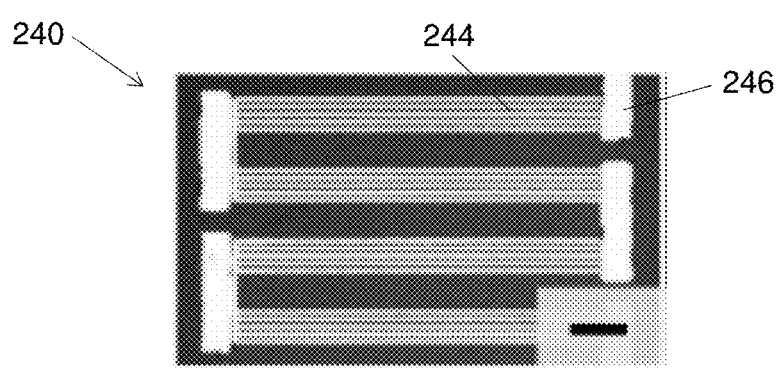
FIG. 3B shows a photograph of a giant magnetoresistance sensor of an assay cassette according to an embodiment of the present invention.
Figure 5:
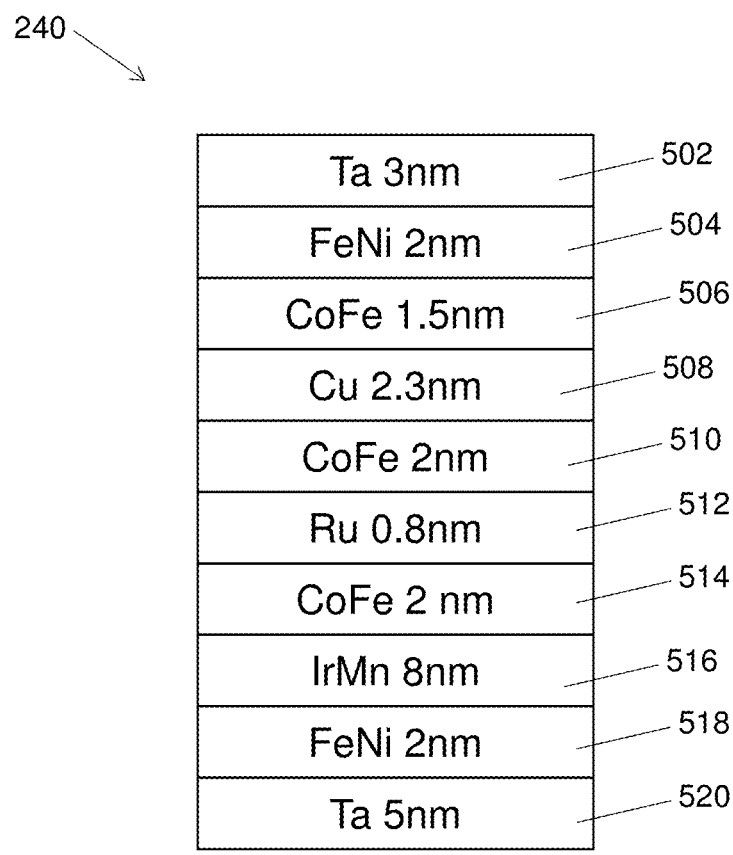
FIG. 5 shows a cross-sectional view of the embedded GMR sensor in an embodiment of the present invention.

FIG. 3B shows a photograph of a giant magnetoresistance sensor of an assay cassette according to an embodiment of the present invention. As shown in FIG. 3B, which is a top down view, the GMR sensor 240 comprises a plurality of parallel strips 244 which are connected to wider coupling parts 246. The scale bar in FIG. 3B indicates 50 µm. A cross section of the GMR sensor 240 is shown in FIG. 5. The GMR film used in our experiment has a bottom spin valve structure. The sensor chip was fabricated by thin film deposition of spin valve on a 4-inch silicon wafer with pinned magnetization set in a selected direction. Each chip sensor consists of 8 detection areas comprising 4 spin valve strips with an electrical active area of 500 µm×5 µm.

Figure 4:
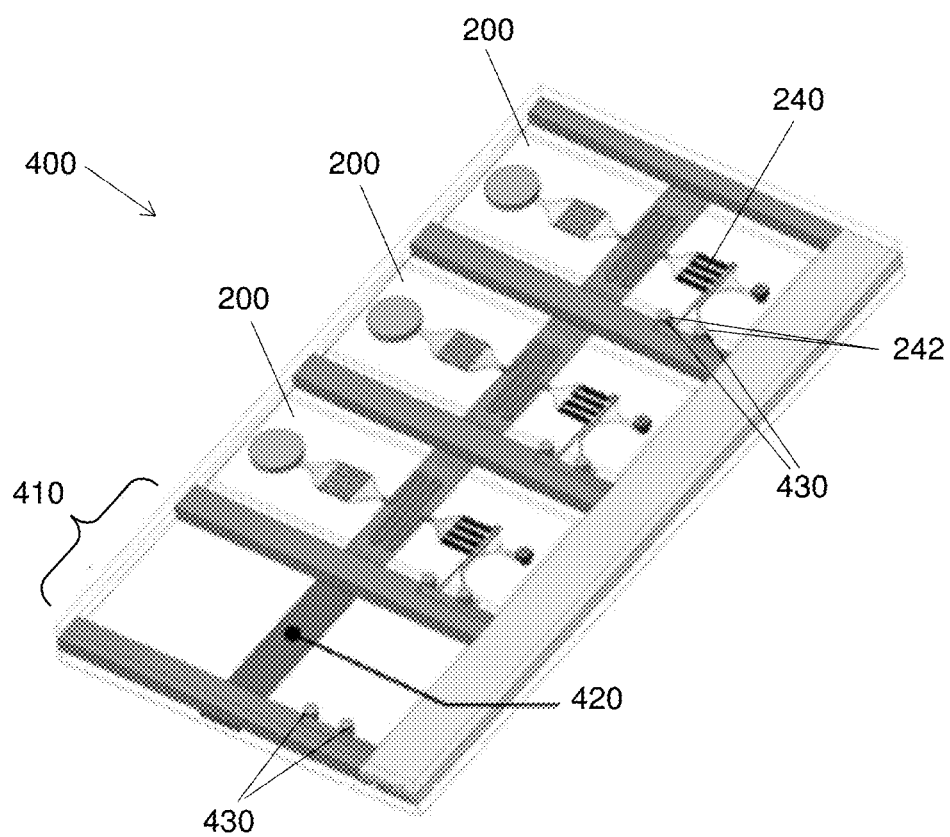
FIG. 4 shows a measurement cartridge for carrying out analysis of extracellular vesicle glycans according to an embodiment of the present invention.

FIG. 4 shows a measurement cartridge for carrying out analysis of extracellular vesicle glycans according to an embodiment of the present invention. The measurement cartridge 400 comprises a plurality of slots 410 to receive assay cassettes 200. The assay cassettes 200 can be slit into the slots 410 on the measurement cartridge 400. A magnetic separation strip 420 runs along the measurement cartridge 400 and overlaps with the serpentine sorters 230 of the assay cassettes 200. Each slot 410 is provided with a part of electrical contacts 430 arranged to contract with the electrodes 242 coupled to the GMR sensor 240 of the respective assay cassette 200 to allow a signal from the GMR sensor 240 to be measured. For multiplexed measurements, four independent assay cassettes can be loaded into a measurement cartridge, enabling four different glycan assays to be performed in parallel. The cartridge not only aligns the external magnetic field with the serpentine sorter, but also provides electrical contacts for simultaneous GMR measurements, thereby streamlining the assay procedure.

FIG. 5 shows a cross-sectional view of the embedded GMR sensor in an embodiment of the present invention. As shown in FIG. 5, the GMR sensor 240 comprises a 3 mn Tantalum layer 502 which is laid over a 2 nm iron-nickel alloy layer 504. The 2 nm iron-nickel alloy layer 504 is laid over a 1.5 nm cobalt-iron alloy layer 506. Under the 1.5 nm cobalt-iron alloy layer 506 there is a 2.3 nm copper layer 508. The 2.3 nm copper layer 508 is laid over a 2 nm cobalt-iron alloy layer 510. Under the 2 nm cobalt-iron alloy layer 510 there is a 0.8 nm Ruthenium layer 512. The 0.8 nm Ruthenium layer 512 is laid over a 2 nm cobalt-iron alloy layer 514. Under the 2 nm cobalt-iron alloy layer 514 there is an 8 nm Iridium-manganese layer 516. The 8 nm Iridium-manganese layer 516 is laid over a 2 nm iron-nickel alloy layer 518. Under the 2 nm iron-nickel alloy layer 518 there is a 5 nm Tantalum layer 520.

FIG. 6A to FIG. 6H show the steps in a method of fabricating a sensor used in embodiments of the present invention. The sensors were fabricated on 4-inch silicon (Si) wafers.

As shown in FIG. 6A, a GMR film 610 was deposited with pinned magnetization set in a selected direction on the silicon wafer 600 through thin film deposition. After coating with photoresist 620, deep ultraviolet (DUV) lithography was performed to define the sensor stripes.

As shown in FIG. 6B, the pattern was transferred via deep reactive ion etching to wafer. This leaves the strip pattern formed by the GMR film 610.

As shown in FIG. 6C, after removing the e-beam resist, a lead pattern was overlaid on the spin valve sensor stripes using optical lithography by application of photoresist 630.

As shown in FIG. 6D, a thick layer (100 nm) of copper (Cu) 640 was then deposited on the wafer by thermal evaporation.

As shown in FIG. 6E, electrical leads and pads to the spin valve sensors were formed after lift-off of photoresist.

As shown in FIG. 6F, optical lithography was performed to define the pad areas by application of photoresist 660.

As shown in FIG. 6G, a thin protective layer (50 nm) of SiO$_2$ 670 was deposited through plasma-enhanced chemical vapor deposition (PECVD) on the sensors and leads.

Finally, as shown in FIG. 6H, pad areas 690 were exposed by lift-off of the photoresist 660.

FIG. 7A to FIG. 7D illustrate a method of analysis of extracellular vesicle glycans according to an embodiment of the present invention. The method is carried out using the assay cassette 200 described above with reference to FIG. 2 when inserted into the measurement cartridge 400 shown in FIG. 4.

Figure 7A:
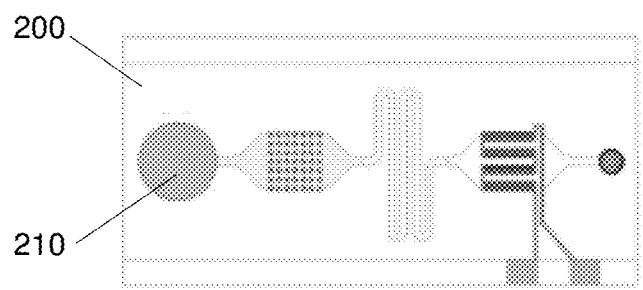
FIG. 7A to FIG. 7D illustrate a method of analysis of extracellular vesicle glycans according to an embodiment of the present invention.

As shown in FIG. 7A, initially magnetic labelling is carried out. Extracellular vesicles and magnetic nanoparticles are introduced into the inlet 210 of the assay cassette 200. Lectins are subsequently introduced into the mixture to induce EV glycan specific aggregation. For on-chip analysis of EV glycans, the assay cassettes were mounted onto the common measurement cartridge. Briefly, in the open inlet of the assay cassette, we mixed 1 μl of sample with 1 μl of PMPs (1 mg/ml, functionalized with either PDA for direct labeling or antibodies for clinical studies), and allowed the mixture to incubate for 5 min for magnetic labeling. 2 μl of BSA (2% in PBS) was then added to this mixture to block any nonspecific binding sites in situ. Subsequently, we added excess lectin (Vector Laboratories) to the mixture to facilitate EV glycan-specific aggregation, and to ensure good availability of lectin binding sites even in the presence of competing free-floating glycoproteins.

Figure 7B:
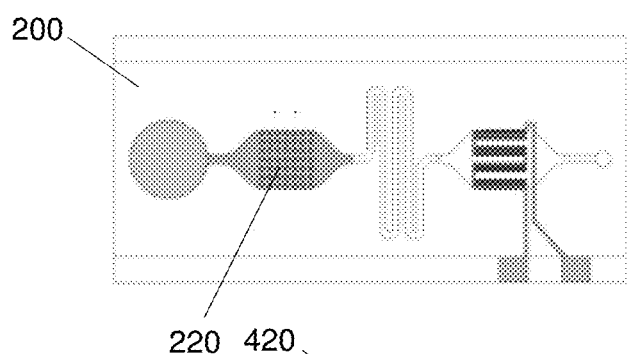

As shown in FIG. 7B, the mixture is flowed through the mixer 220 of the assay cassette 200 which comprises an array of micropillars to enhance multivalent lectin binding and aggregation. All fluidic flow was actuated by a syringe pump (Harvard Instruments) to exert a negative pressure at the common measurement cartridge.

Figure 7C:
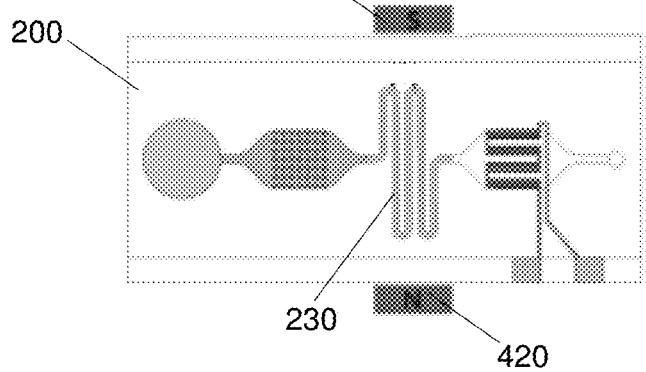

Then, as shown in FIG. 7C, the mixture flows through the serpentine channel 230 of the assay cassette 200. As the mixture flows through the serpentine channel 230, it is subjected to a magnetic field applied by the magnetic separation strip 420 of the measurement cartridge 400. The magnetic field causes the larger aggregates to be sedimented. The smaller magnetic particles remain suspended in the supernatant. The applied external magnetic field had a strength of 300 mT, and duration 5 sec.

Figure 7D:
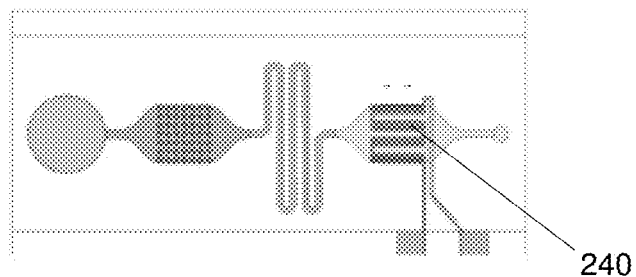

Then, as shown in FIG. 7D, the magnetic content of the supernatant is measured through the on-chip GMR sensor 240 in real time and can be correlated to EV glycan composition.

Specifically, the mixture was first introduced across the microfluidic pillar array to enhance local mixing and aggregation, before entering the serpentine channel for effective larger aggregates separation. We then measured the magnetic signal of residual small PMPs in the supernatant via the embedded GMR sensor.

To develop the assay platform, we evaluated functional PMPs coated with different polymers to magnetically label EVs. Specifically, we prepared polycore magnetic nanomaterials that could induce strong GMR signals.

Figure 8A:
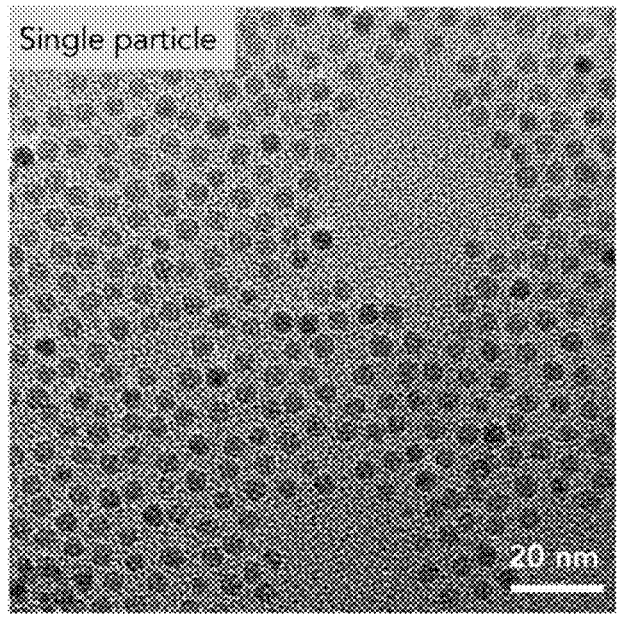
FIG. 8A is a transmission electron micrograph of small $Fe_3O_4$ particles and FIG. 8B is a transmission electron micrograph of polycore particles used in embodiments of the present invention.
Figure 8B:
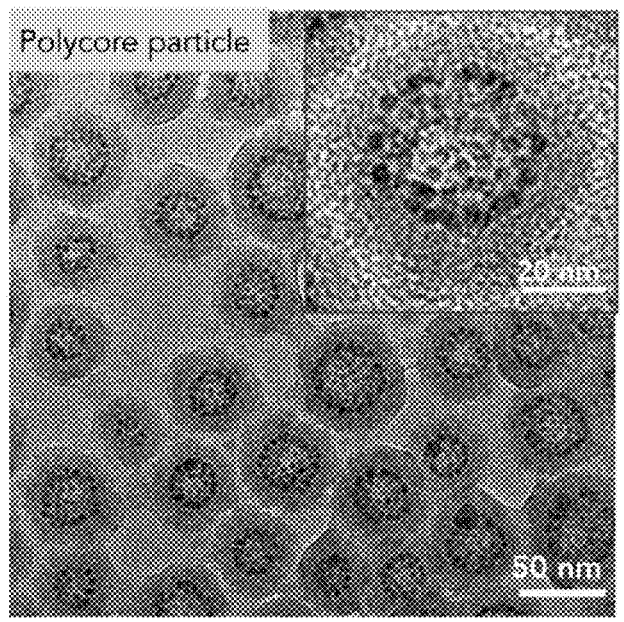

FIG. 8A is a transmission electron micrograph of small Fe$_3$O$_4$ particles and FIG. 8B is a transmission electron micrograph of polycore particles used in embodiments of the present invention. As shown in FIG. 8B, the polycore particles have a diameter in the range 20 nm to 50 nm.

Figure 9:
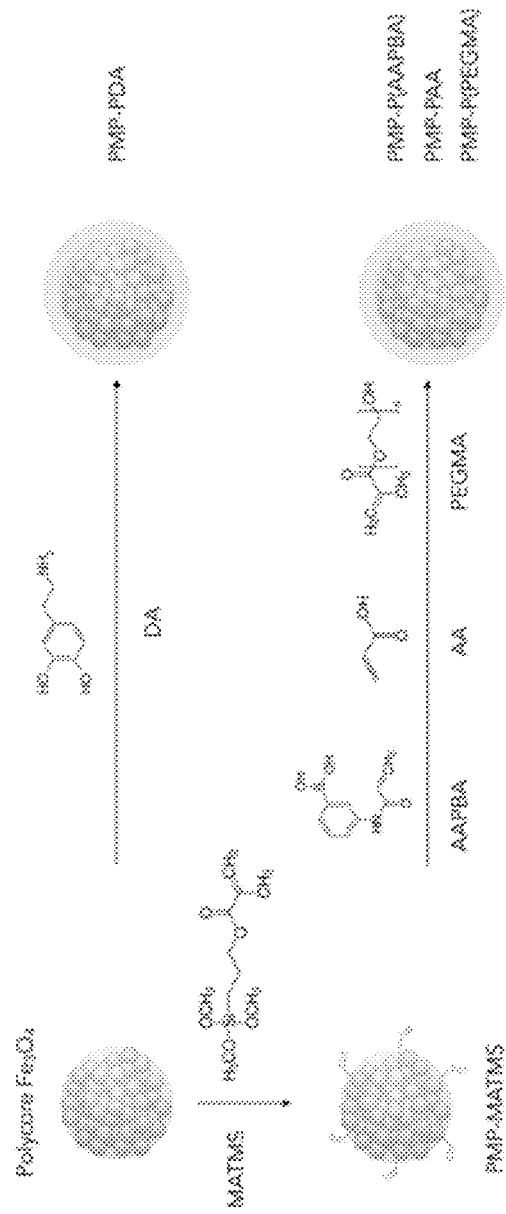
FIG. 9A and FIG. 9B show GMR output signal and change in GMR output signal respectively for two different magnetic nanoparticles.
FIG. 9C shows a schematic of nanoparticle functionalization with polymers.
Figure 9A:
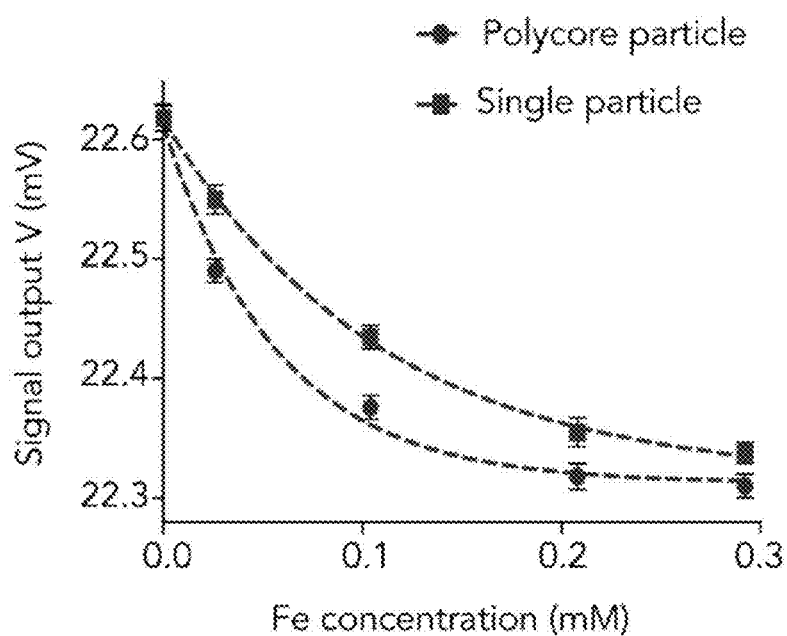
Figure 9B:
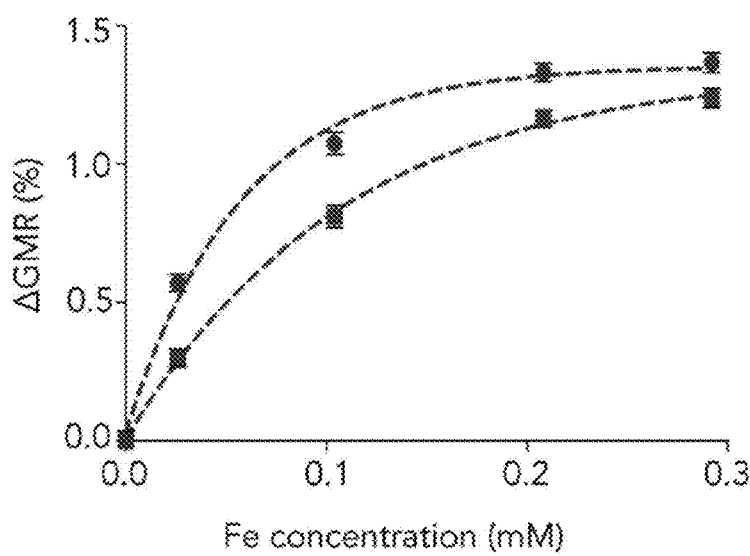

FIG. 9A and FIG. 9B show GMR output signal and change in GMR output signal respectively for two different magnetic nanoparticles. The change in GMR signal (ΔGMR) was determined as $(V_{ef} - V_{Fe}/V_{ref})$, where $V_{ref}$ is the inherent voltage signal output of the GMR sensor, $V_{Fe}$ is the signal output at a certain Fe concentration.

Figure 9C:
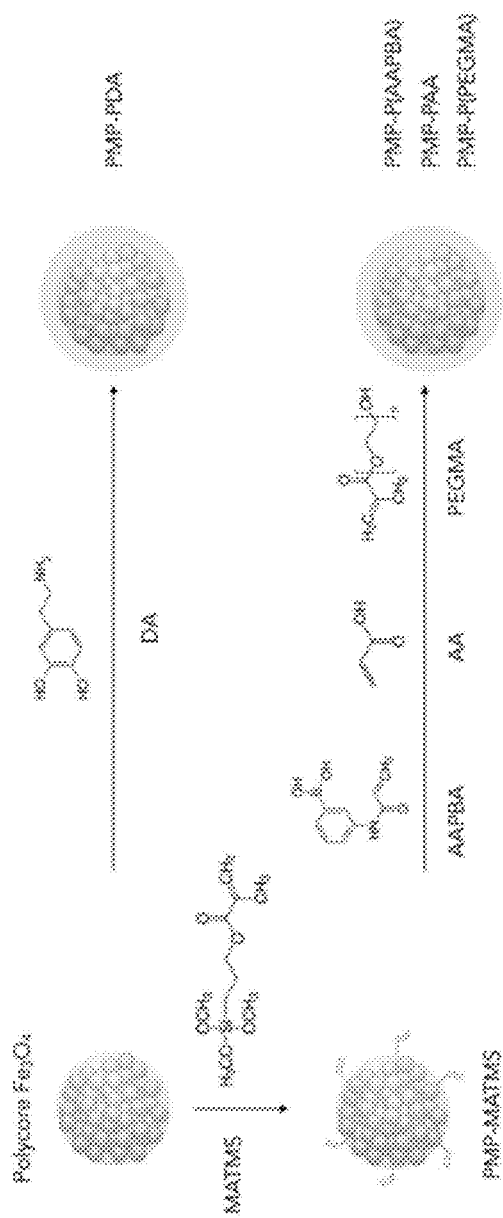

FIG. 9C shows a schematic of nanoparticle functionalization with polymers. Polycore particles were grafted with dopamine (DA) to prepare PMP-PDA. To functionalize with other polymers, polycores were modified with MATMS to introduce surface reactive double bonds before functionalization with 3-acrylamidophenylboronic acid (AAPBA), acrylic acid (AA), and polyethylene glycol methacrylate (PEGMA) to prepare PMP-P(AAPBA), PMP-PAA, and PMP-P(PEGMA), respectively.

To evaluate the labeling efficiency of these functional PMPs for EVs, we incubated an equal amount of each nanomaterial with a known concentration of EVs. After magnetic isolation of the PMPs, we measured the remaining EV counts as well as the molecular contents in the supernatants to determine the respective labeling efficiencies. Through both analyses, PMPs coated with PDA demonstrated the highest labeling efficiency (>90%), even with EVs derived from diverse cell origins and complex biological fluids (i.e., serum and urine). We attribute this high performance to PDA's unique adhesion properties, thereby enabling various interactions (e.g., covalent and electrostatic) with diverse EV-surface biomolecules. When evaluated at different EV concentrations, the PDA coating showed not only effective labeling, but also rapid binding. Complete magnetic labeling could be accomplished in as little as 2 min, even in sparse samples (<10$^7$ EVs/ml). We thus chose PMPs coated with PDA as the optimal nanomaterial for subsequent assay development.

Figure 10A:
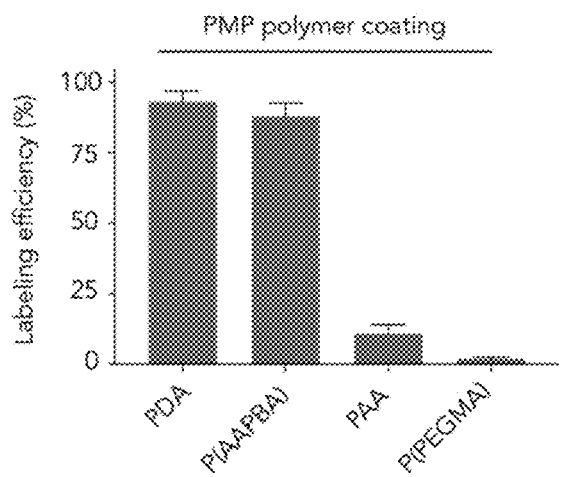
FIG. 10A shows a comparison of EV labeling efficiencies by different functional nanoparticles.

FIG. 10A shows a comparison of EV labeling efficiencies by different functional nanoparticles. PMPs were grafted with different polymers to investigate their interactions with EVs. All materials were prepared to achieve comparable hydrodynamic diameters. An equal amount of respective PMPs were incubated with a known concentration of EVs derived from human kidney cancer cells (A498). PMPs with PDA coating showed the highest labeling efficiency and was used for subsequent assay development.

As EVs are multivalent targets with multiple surface biomolecules, we thus examined the effect of PMP size in inducing nanoparticle aggregation. We prepared different-sized PMPs and measured their aggregation when treating to an equal concentration of EVs and lectin RCA120.

Figure 10B:
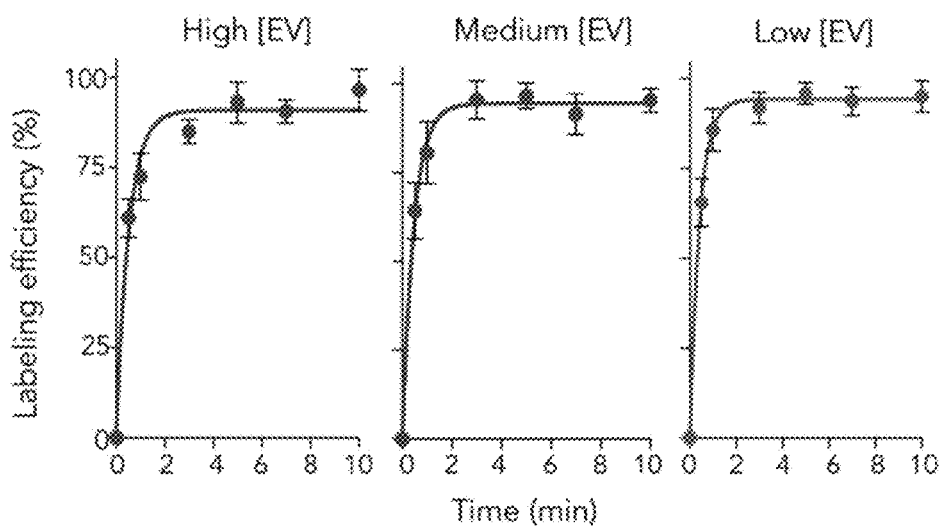
FIG. 10B shows results of an investigation of dynamics of EV binding.

FIG. 10B shows results of an investigation of dynamics of EV binding. We prepared EVs at various concentrations (derived from A498 cells; high, 10$^9$/ml; medium, 10$^8$/ml; low, 10$^7$/ml) and monitored the temporal labeling efficiencies upon incubation with a fixed amount of PMPs. Labeling efficiencies were determined from vesicle counts in the supernatants.

Figure 10C:
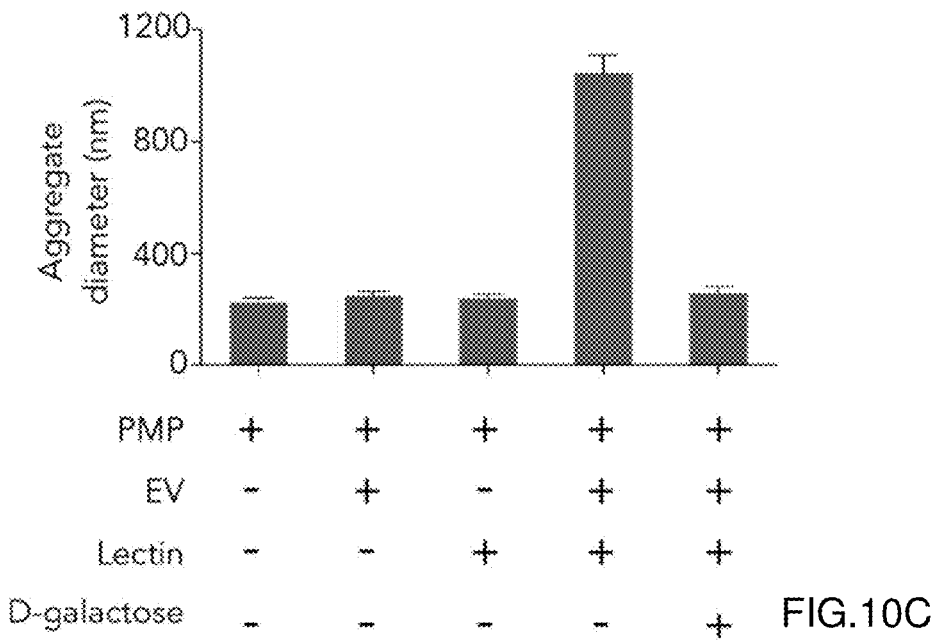
FIG. 10C shows results of an investigation of specificity of magnetic aggregation.

FIG. 10C shows results of an investigation of specificity of magnetic aggregation. We measured the average hydrodynamic diameters of the PMPs under different experiment conditions (+, present; −, absent). The PMPs aggregated only in the presence of both EVs (derived from A498 cells) and lectins (RCA120, which bind to galactose-associated carbohydrates commonly found in EVs). This aggregation could be competitively inhibited through the addition of galactose. In the absence of EVs or targeting lectins, the PMPs remained dispersed, as that of the untreated particles.

Figure 10D:
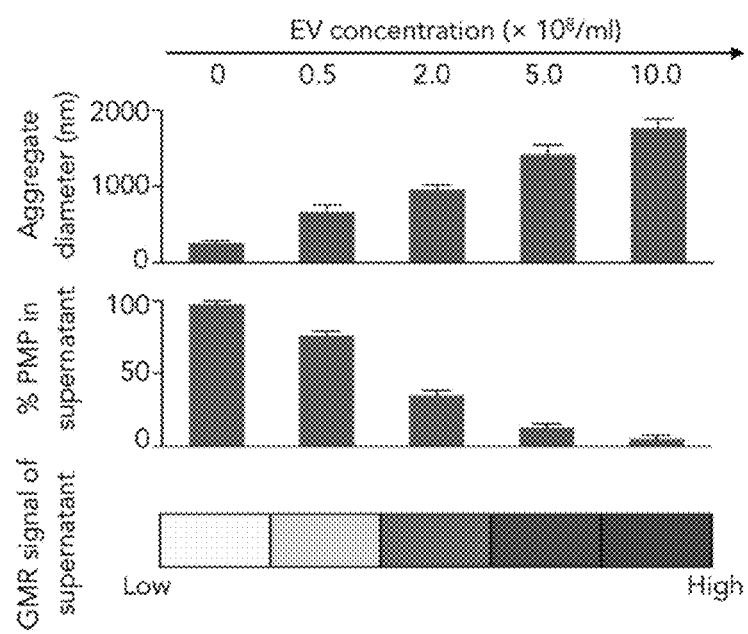
FIG. 10D shows results of an investigation of correlation of magnetic signal to EV glycan concentration.

FIG. 10D shows results of an investigation of correlation of magnetic signal to EV glycan concentration. When treated with an increasing amount of EV glycans, the PMPs aggregated more extensively, as demonstrated by the increasing hydrodynamic diameters of the clusters (top). These magnetic aggregates were depleted through an external magnetic field, leading to a decreasing amount of residual PMPs in the supernatant (middle). We measured the magnetic signal of the supernatant through the GMR sensor. The GMR signals were displayed as a heat map, and showed a positive correlation to the amount of EV glycans (bottom). All measurements were performed in triplicate, and the data are displayed as mean±s.d.

As EVs are multivalent targets with multiple surface biomolecules, we thus examined the effect of PMP size in inducing nanoparticle aggregation. We prepared different-sized PMPs and measured their aggregation when treating to an equal concentration of EVs and lectin RCA120.

Figure 11:
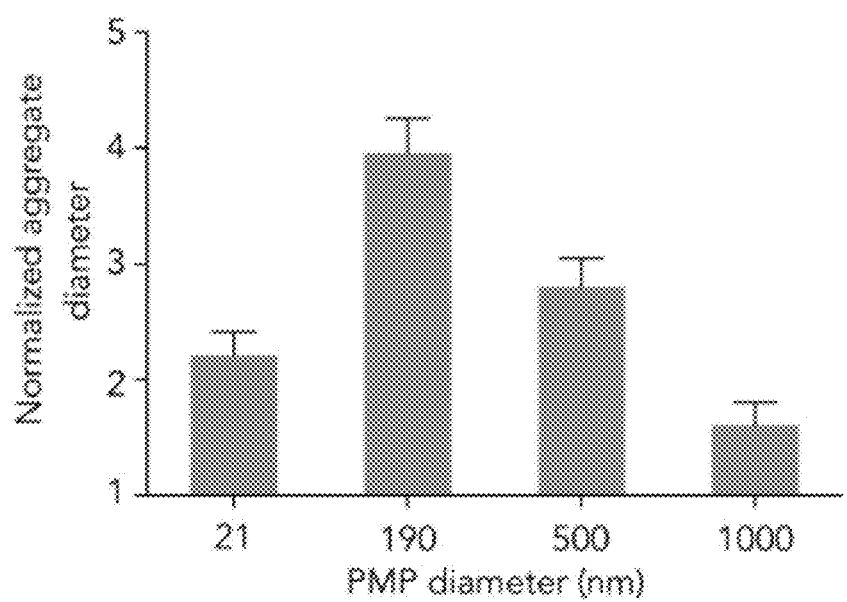
FIG. 11 shows results of an investigation of size-matched PMPs for measuring EV-bound glycans.

FIG. 11 shows results of an investigation of size-matched PMPs for measuring EV-bound glycans. We prepared different-sized PMPs, each coated with PDA, and incubated the nanomaterials with an equal concentration of EVs (A498 cells) in the presence of lectin RCA120. Aggregate diameters were normalized against that of untreated PMPs. The 190-nm PMPs showed the highest signal.

Figure 12A:
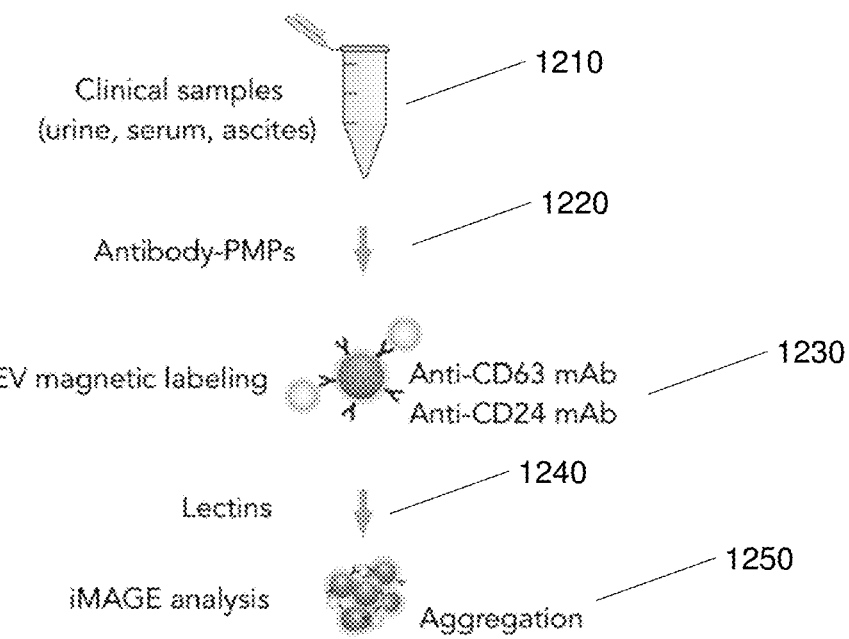
Figure 12B:
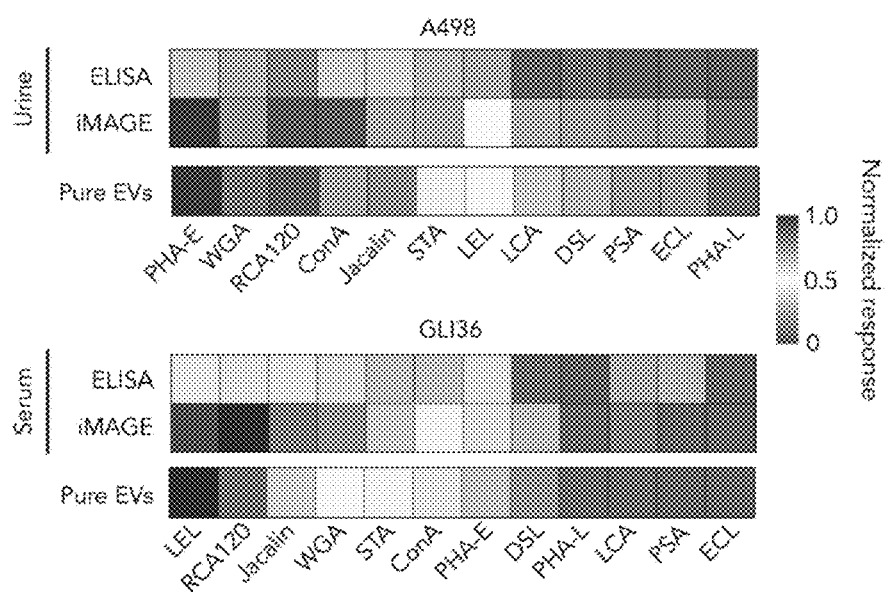

FIG. 12A to FIG. 12C show analysis of cancer extracellular vesicles to determine a prognosis.

FIG. 12A shows a schematic of the analysis. Biofluids (e.g., urine, serum, ascites) 1210 are incubated with PMPs functionalized with antibodies 1220 to target against specific cancer antigens 1230. This enhances magnetic measurement of putative cancer EVs with PMPs. Without further washing, the samples are treated with lectins 1240 to enable EV glycan-specific aggregation 1250 and analysis.

FIG. 12B shows analysis of mock clinical specimens. Samples were prepared by spiking EVs of kidney cancer (A498) and brain cancer (GLI36) into vesicle-depleted urine and serum, respectively. The results labelled iMAGE were obtained using the methods and devices according to embodiments of the present invention. We used PMPs functionalized with anti-CD63 antibodies to magnetically label EVs and perform measurements. In both samples, the platform showed a good correlation ($R^2 > 0.85$) to the glycan signatures of the pure cancer EVs. All signals were normalized against respective pure EV measurements. For comparison, FIG. 12B shows results from Enzyme-linked immunosorbent assay (ELISA). EVs were adsorbed onto ELISA plates (Thermo Scientific) and blocked in PBS containing 1% BSA for ELISA measurements. After washing, biotinylated antibodies (anti-CD63, 1 µg/ml, BD Biosciences) or biotinylated lectins (2 µg/ml, Vector Laboratories) were added in the blocking solution and incubated for 2 h at room temperature. Following incubation with FITC-conjugated streptavidin (BD Biosciences), fluorescence signals were determined (Tecan).

FIG. 12C shows analysis of 21 lectin markers in clinical cancer ascites (n=11). Patient samples were analyzed via anti-CD24 functionalized PMPs. Through hierarchical clustering of the patient specimens (row) and their lectin signals (column), the analysis could categorize the clinical samples into two distinct groups. This EV glycan-based classification showed a strong concordance to independent clinical evaluation of patient prognosis. Specifically, lectin markers could be classified as poor prognosis markers ($P<0.0001$, two-way ANOVA) or non-differentiating markers. All measurements in (B-C) were performed in triplicate with sample-matched controls and the data are displayed as mean values. a.u., arbitrary unit.

For clinical analysis, ascites samples were used directly. To enable selective measurement of glycan signatures on cancer EVs, we incubated the ascites samples with PMPs functionalized with antibodies against CD24, before introducing different lectins to induce glycan specific aggregation. For all measurements, we included a patient sample-matched, no-lectin control. Analysis was performed relative to this control to account for sample matched non-specific aggregation. Clinical evaluation of patient characteristics was determined independently. Specifically, patient prognosis was determined by the overall survival from the time of collection of the ascites. Patients were deemed to have a good prognosis when the overall survival was more than ten months. Conversely, patients were determined to have a poor prognosis if the overall survival was less than five months. All measurements were performed blinded from these clinical evaluations.

The scientific applications of the embodiment of the present invention are potentially broad. With its sensitive and specific detection, we anticipate that the platform could be readily expanded to measure other EV surface markers, including established as well as novel EV modifications (e.g., ubiquitination). Its solution-phase magnetic actuation further improves assay performance and eases probe selection (e.g., low-affinity binders), to identify weak but true interactions, and could be readily integrated with other technologies to facilitate molecular assay development. Such studies will not only improve biomarker characterization, but also empower new applications. As demonstrated by the present disclosure, the identification of a conserved EV glycan signature could enable the development of novel glycan-based approaches for ubiquitous EV enrichment from complex biofluids Whilst the foregoing description has described exemplary embodiments, it will be understood by those skilled in the art that many variations of the embodiments can be made within the scope and spirit of the present invention.

The invention claimed is:

1. A microfluidic device for analyzing extracellular vesicle glycans, the microfluidic device comprising:
   an inlet portion configured to receive a fluid sample;
   a mixing portion fluidically coupled to the inlet portion and configured to facilitate mixing between the fluid sample and magnetic nanoparticles functionalized to bind with extracellular vesicles and aggregate to extracellular vesicle glycans in the fluid sample;
   a magnetic separation portion comprising a serpentine channel overlaid with a magnetic strip, the magnetic separation portion fluidically coupled to the mixing portion and configured to separate clusters of magnetic nanoparticles from the fluid sample; and
   a magnetic sensor configured to measure magnetic properties of the fluid sample after it has passed through the magnetic separation portion.

2. A microfluidic device according to claim 1, wherein the magnetic sensor is a giant magnetoresistance sensor.

3. A microfluidic device according to claim 1, wherein the mixing portion comprises an array of micropillars.

4. A system for analyzing extracellular vesicle glycans in a fluid sample, the system comprising:
   a plurality of microfluidic devices for analyzing extracellular vesicle glycans, each of the plurality of microfluidic devices comprising:

an inlet portion configured to receive a fluid sample;
a mixing portion fluidically coupled to the inlet portion and configured to facilitate mixing between the fluid sample and magnetic nanoparticles functionalized to bind with extracellular vesicles and aggregate to extracellular vesicle glycans in the fluid sample;
a magnetic separation portion comprising a serpentine channel overlaid with a magnetic strip, the magnetic separation portion fluidically coupled to the mixing portion and configured to separate clusters of magnetic nanoparticles from the fluid sample; and
a magnetic sensor configured to measure magnetic properties of the fluid sample after it has passed through the magnetic separation portion;
magnetic nanoparticles functionalized to bind with extracellular vesicles; and
a plurality of different lectins, wherein each of the plurality of different lectins binds with different respective target extracellular vesicle glycan.

5. The system of claim 4, wherein the magnetic nanoparticles comprise a magnetic polycore covered in a polymer coating functionalized to bind with the extracellular vesicles.

6. The system of claim 5, wherein the polymer coating is functionalized to bind with multiple extracellular vesicles.

7. The system of claim 6, wherein the polymer coating is functionalized with polydopamine.

8. The system of claim 5, wherein the polymer coating is functionalized with recognition elements selected to bind with specific extracellular vesicles expressing respective biomarkers.

9. The system of claim 5, wherein the magnetic nanoparticles are configured to aggregate in the presence of the different lectins, wherein each different lectin induces glycan specific aggregation.

10. The system of claim 5, wherein the magnetic nanoparticles have a diameter selected to correspond to a diameter of the extracellular vesicles of the targeted extracellular vesicle glycans.

11. The system of claim 5, wherein the magnetic nanoparticles have a diameter in the range 20 nm to 1000 nm.

12. A method of analyzing target extracellular vesicle glycans in a fluid sample, the method comprising:
adding the fluid sample to a microfluidic device comprising:
an inlet portion configured to receive the fluid sample;
a mixing portion fluidically coupled to the inlet portion and configured to facilitate mixing between the fluid sample and magnetic nanoparticles functionalized to bind with extracellular vesicles and aggregate to extracellular vesicle glycans in the fluid sample;
a magnetic separation portion comprising a serpentine channel overlaid with a magnetic strip, the magnetic separation portion fluidically coupled to the mixing portion and configured to separate clusters of magnetic nanoparticles from the fluid sample; and
a magnetic sensor configured to measure magnetic properties of the fluid sample after it has passed through the magnetic separation portion;
mixing the fluid sample with magnetic nanoparticles functionalized to bind with extracellular vesicles present in the fluid sample and a lectin selected to bind with target extracellular vesicle glycans at the mixing portion of the microfluidic device;
passing the fluid sample through the magnetic separation portion to magnetically separate nanoparticle clusters formed by multivalent binding of the lectins and target extracellular vesicle glycans;
measuring a magnetic property of the fluid sample that passed through the magnetic separation portion at the magnetic sensor; and
determining a characteristic of the extracellular vesicle glycans in the fluid sample from the magnetic property.

13. The method of claim 12, wherein the method is repeated on a plurality of portions of the fluid sample using different lectins to obtain a plurality of measured magnetic properties, each different lectin having a different respective target extracellular vesicle glycan.

14. The method of claim 13, wherein the plurality of measured magnetic properties identifies at least one conserved glycan signature.

15. The method of claim 14, wherein the conserved glycan signature is measured with lectin that is RCA120 and/or WGA.

* * * * *